W. B. POTTER.
TERMINAL FOR ELECTRICAL APPARATUS.
APPLICATION FILED SEPT. 7, 1907.
973,560.
Patented Oct. 25, 1910.
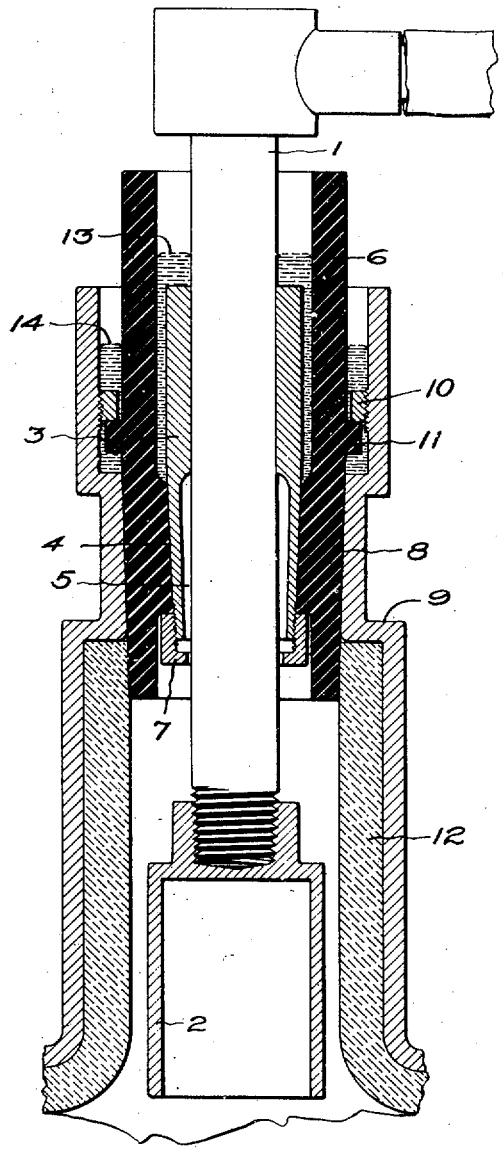
WITNESSES:
Benjamin B. Hull
Frank J. Dore
INVENTOR
WILLIAM B. POTTER,
BY Albert G. Davis
ATT'Y.

UNITED STATES PATENT OFFICE.

WILLIAM B. POTTER, OF SCHENECTADY, NEW YORK, ASSIGNOR TO GENERAL ELECTRIC COMPANY, A CORPORATION OF NEW YORK.

TERMINAL FOR ELECTRICAL APPARATUS.

973,560.   Specification of Letters Patent.   Patented Oct. 25, 1910.

Application filed September 7, 1907. Serial No. 391,770.

*To all whom it may concern:*

Be it known that I, WILLIAM B. POTTER, a citizen of the United States, residing at Schenectady, county of Schenectady, State of New York, have invented certain new and useful Improvements in Terminals for Electrical Apparatus, of which the following is a specification.

My present invention relates to terminals for electrical apparatus and comprises a vacuum tight terminal applicable to vapor electric apparatus, such as mercury arc rectifiers or lamps, and more particularly applicable to vapor electric apparatus of large size carrying heavy currents.

The novel features of my invention are particularly pointed out in the appended claims, and for a better understanding of the same reference may be had to the following detailed description taken in connection with the accompanying drawing.

The drawing shows a conductor 1, which may be of copper or other material, carrying an electrode 2 suitable for use as anode in a mercury vapor rectifier or similar device. Surrounding a portion of conductor 1 and brazed thereto or integral therewith is a sleeve 3 having a tapered outer surface 4. It also has a recess 5 underlying this tapered portion to render the tapered walls resilient or yielding. The tapered surface 4 of the sleeve fits tightly within a tube 6 of insulating material, such as porcelain. The tapered joint may have a ground fit and the two members may be locked together by means of a nut 7 screw-threaded to the lower end of sleeve 3. The insulating tube 6 is likewise tapered on its outer surface 8 to fit the opening in a casing 9, and the tapered joint may be ground to a tight fit and may be maintained tight by means of a nut 10 bearing on an annular flange 11 integral with the porcelain tube. Only a portion of the casing 9 is shown, but when this casing is of metal and forms the envelop for a mercury arc device, it may be lined with a refractory insulating material 12, as shown in the drawing.

If desired, the tapered joints above mentioned may be further sealed by means of mercury held in the annular channels between the several parts, as indicated at 13 and 14 in the drawing.

The yielding nature of the tapered portion of sleeve 3 prevents any trouble from unequal expansion of the several parts of the terminal.

What I claim as new and desire to secure by Letters Patent of the United States, is,—

1. The combination of an air-tight casing, an insulating tube fitted thereto with a tapered joint, and a conductive member passed through said tube and having a resilient tapered portion fitting tightly within said tube.

2. The combination of an air-tight casing, an insulating tube forming a tight fit therewith, and a conductor passing through said tube and having a sleeve yieldingly connecting with a tapered surface within said tube.

3. The combination with a vacuum tight casing, of an insulating tube and a conductive member, and means affording a yielding air-tight joint between said conductor and said tube.

4. The combination with an air-tight chamber, of a mercury vapor apparatus, a conductor passing into said casing, a sleeve carried on said conductor and having a tapered portion with yielding walls, a tube engaging said tapered portion and forming an air-tight joint therewith, and a body of mercury for excluding air from said tapered joint.

5. The combination of an air-tight casing, a conductor passing into said casing, a tapered member for preventing leakage of air into said casing, and a yielding sleeve contacting with said tapered member to compensate for unequal expansion between said conductor and said tapered member.

6. The combination of an air-tight casing, a conductor passing into said casing and carrying an anode, a tapered bearing surface carried by said conductor, an insulating tube fitting tightly against said tapered surface and forming an air-tight joint with said casing and means for locking said tube in position.

7. The combination with an air-tight metal casing, of a conductive member passing into said casing, and a tubular tapered closure with a resilient tubular packing wedged between said tubular closure and said conductive member, and means for locking said tubular closure in position.

In witness whereof, I have hereunto set my hand this 5th day of September, 1907.

WILLIAM B. POTTER.

Witnesses:
BENJAMIN B. HULL,
BERTHA SECOR.